(12) United States Patent
Berthier et al.

(10) Patent No.: US 9,372,791 B2
(45) Date of Patent: Jun. 21, 2016

(54) METHOD FOR MASKING THE END-OF-LIFE TRANSITION OF AN ELECTRONIC DEVICE AND DEVICE COMPRISING A CORRESPONDING CONTROL MODULE

(75) Inventors: Mael Berthier, Paris (FR); Michael Barthe, Paris (FR)

(73) Assignee: MORPHO, Issy-Les-Moulineaux (FR)

( * ) Notice: Subject to any disclaimer, the term of this patent is extended or adjusted under 35 U.S.C. 154(b) by 280 days.

(21) Appl. No.: 14/005,805

(22) PCT Filed: Jan. 10, 2012

(86) PCT No.: PCT/FR2012/050069
§ 371 (c)(1),
(2), (4) Date: Sep. 17, 2013

(87) PCT Pub. No.: WO2012/127138
PCT Pub. Date: Sep. 27, 2012

(65) Prior Publication Data
US 2014/0013042 A1 Jan. 9, 2014

(30) Foreign Application Priority Data
Mar. 21, 2011 (FR) ...................................... 11 52313

(51) Int. Cl.
*G06F 12/00* (2006.01)
*G06F 12/02* (2006.01)
(Continued)

(52) U.S. Cl.
CPC .......... *G06F 12/0246* (2013.01); *G06F 21/558* (2013.01); *G06F 21/75* (2013.01);
(Continued)

(58) Field of Classification Search
CPC ....... G06F 21/55; G06F 21/75; G06F 21/558; G06F 12/0246
See application file for complete search history.

(56) References Cited

U.S. PATENT DOCUMENTS 6,698,662 B1 3/2004 Feyt et al.
2010/0299511 A1* 11/2010 Pelletier ................ G06F 21/558
713/2

FOREIGN PATENT DOCUMENTS

FR 7 08 242 A 7/1931
FR 2 776 410 A1 9/1999
(Continued)

OTHER PUBLICATIONS

Search Report for FR 11 52313, dated Nov. 4, 2011.
Search Report for PCT/FR2012/050069, mailed Apr. 10, 2012.
(Continued)

*Primary Examiner* — Kevin Verbrugge
*Assistant Examiner* — Alan Otto
(74) *Attorney, Agent, or Firm* — Marshall, Gerstein & Borun LLP

(57) ABSTRACT

The invention relates to a method for masking the end-of-life transition of an electronic microprocessor device comprising a reprogrammable non-volatile memory containing an end-of-life state variable (FdVE). The value of the variable (FdVE) is loaded (A) into random access memory. Prior to the execution of any current command (COM), the value of the variable (FdVR) in random access memory is checked (B). The end-of-life transition is executed (C) in the event of an empty value. Otherwise, the initialization or the execution of the command (COM) is continued (D). Upon detection (E) of an intrusive attack, the end-of-life state variable (FdVR) is written (F) in the single random-access memory, and the end-of-life state variable (FdVE) is deleted (G) from the non-volatile memory in a delayed manner. The invention is suitable for all electronic devices, microprocessor cards or the like.

9 Claims, 4 Drawing Sheets

(51) Int. Cl.
*G06F 21/75* (2013.01)
*H04L 29/06* (2006.01)
*G09C 1/00* (2006.01)
*H04L 9/00* (2006.01)
*G06F 21/55* (2013.01)

(52) U.S. Cl.
CPC ............... *G09C 1/00* (2013.01); *H04L 9/004* (2013.01); *H04L 63/1441* (2013.01); *G06F 21/55* (2013.01); *G06F 2221/2143* (2013.01)

(56) References Cited

FOREIGN PATENT DOCUMENTS

| | | |
|---|---|---|
| FR | 2 784 763 A1 | 4/2000 |
| FR | 2 924 262 A1 | 5/2009 |
| WO | WO-2009/071819 A1 | 6/2009 |

OTHER PUBLICATIONS

Written Opinion for PCT/FR2012/050069, mailed Apr. 10, 2012.

\* cited by examiner

METHOD FOR MASKING THE END-OF-LIFE TRANSITION OF AN ELECTRONIC DEVICE AND DEVICE COMPRISING A CORRESPONDING CONTROL MODULE

FIELD OF THE INVENTION

The invention relates to a method for masking the end-of-life transition of an electronic device comprising an input/output port, a microprocessor, random access memory, read-only memory, and reprogrammable non-volatile memory containing an end-of-life state variable for the electronic device, the state variable being managed by a control module.

BACKGROUND OF THE INVENTION

Such electronic devices correspond (although not exclusively) to circuit boards or to any electronic device comprising or connected to at least one circuit board, such as a smart card, for which good security against external intrusion is required.

To ensure that such cards provide good security, an end-of-life transition mechanism is activated upon detection of a certain number of critical errors.

The end-of-life transition process for this type of device, particularly smart cards, appears problematic, however, because such a process conventionally relies on a process of writing to non-volatile reprogrammable memory, generally EEPROM memory, in order to modify the data and block the applications.

Such a process appears vulnerable, because it is detectable outside the card due to the strong draw of current caused by the write to reprogrammable memory.

A malicious third party therefore has ample opportunity to prevent the execution of such a process, by cutting off the power to the device or to the card.

To improve this situation, FR 07 08242 and PCT/FR2008/052106 propose ensuring that the end-of-life transition process for such an electronic device occurs within a random period after the critical error event which triggered the end-of-life transition, while masking from third parties the write to non-volatile memory corresponding to the end-of-life transition, which in practice prevents any covert channel attack.

In this technique, the writing of an end-of-life transition state variable to the non-volatile memory of an electronic device is masked by obscuring this write operation within the normal operation of the application program executed by the electronic device.

In practice, the operation of writing a variable to non-volatile memory always consists of two successive phases: a deletion phase, which sets the variable to an empty value ("empty value" is understood to mean a predefined default value on which a user of the non-volatile memory has no influence, such as "00", "FF" or some other value), then an actual write phase, during which a non-empty value (meaning a value distinct from the empty value) is assigned to the variable in the space dedicated to it within the non-volatile memory. The writing of an end-of-life transition state variable to the non-volatile memory of an electronic device, as specified in the prior art mentioned above, also falls under this rule.

Each of these phases of deleting and writing which constitute the operation of writing a variable to non-volatile memory requires a certain amount of processing time and consumes a certain amount of electrical energy, approximately similar in both cases.

SUMMARY OF THE INVENTION

Given this prior art technique, an object of the invention is to improve its performance while maintaining the level of security provided by masking the end-of-life transition.

For this purpose, the invention proposes a method for masking the end-of-life transition of an electronic device comprising a microprocessor, a random access memory, a read-only memory, a reprogrammable non-volatile memory containing an end-of-life state variable of the electronic device, said state variable being managed by a control module, and an input/output port. This method comprises the following steps:
loading the value of said end-of-life state variable into random access memory, from said non-volatile memory; and, prior to the execution of any current command by said microprocessor:
checking the value of said end-of-life state variable stored in random access memory; and in the event of an empty value (meaning a predefined default value for the non-volatile memory): executing the end-of-life transition operations for the electronic device; otherwise, said end-of-life state variable stored in random access memory having a non-empty value (meaning a value different from the empty value):
continuing the initialization and/or execution of the current command by the microprocessor of the electronic device; and, upon detection of an intrusion attack:
writing said end-of-life state variable of the electronic device to the sole random access memory, and continuing the initialization and/or execution of the current command; and
performing a deletion only of the end-of-life state variable in said non-volatile memory, in a deferred manner so that it is carried out in place of the next update operation (delete and/or write) in non-volatile memory.

The act of deferring the update of the end-of-life state variable in said non-volatile memory effectively masks the end-of-life transition of the electronic device, because a malicious third party is unable to distinguish the draw of current caused by updating the end-of-life state variable from the draw caused by the normal execution of a command executed by the microprocessor of the electronic device. A level of security is obtained that is the same as in FR 07 08242 and PCT/FR2008/052106.

In addition, the act of performing a "deletion only," meaning a deletion phase not followed by a write phase, of the end-of-life state variable in said non-volatile memory limits the processing time and electrical consumption required, e.g. by about a factor of 2. Performance during execution of an application program by the electronic device is thus greatly improved.

In some advantageous embodiments which can be combined in any conceivable manner, the method may additionally have some or all of the following characteristics.

For a set of commands executed by the microprocessor of the electronic device, including commands comprising a systematic operation in non-volatile memory and commands not comprising any operations in non-volatile memory, the method may additionally comprise, independently of the detection or non-detection of an intrusion attack, the execution of a deletion only of a dummy variable in non-volatile memory. This further conceals the deletion of the end-of-life state variable of the electronic device in non-volatile memory, by introducing "decoy" deletions with a similar electrical signature. It is thus even more difficult for a malicious third party to identify the deletion of the end-of-life state variable from the single current draw that it generates.

The deletion only of the dummy variable in non-volatile memory can be executed in the same page of memory as that of the end-of-life state variable.

The deletion only of the dummy variable in non-volatile memory can be executed prior to any execution of a data transmission operation on the line of the input/output port of the electronic device.

Following any deletion only of the end-of-life state variable in non-volatile memory, there is a step consisting of checking whether the value of the end-of-life state variable is the empty value, and in the event that it does have this empty value, a step of executing the end-of-life transition operations for the electronic device.

Upon verification that the end-of-life state variable does have the empty value, a deletion only of the value of the end-of-life state variable in non-volatile memory can be substituted for the deletion only of the dummy variable in non-volatile memory.

Upon detection of a temporary error in the execution of an instruction that is different from an intrusion attack and does not justify an end-of-life transition of the electronic device, said method can additionally include:

incrementing an error counter in random access memory;

comparing the value of the error counter to a threshold value, and if said threshold value is exceeded by said error counter value:

writing the value of said end-of-life state variable of the electronic device in the random access memory and executing the end-of-life transition for the electronic device.

The invention also proposes an electronic device comprising a microprocessor, a random access memory, a read-only memory, a reprogrammable non-volatile memory containing an end-of-life state variable for the electronic device, said state variable being managed by a control module, and an input/output port (I/O). The control module includes a computer program module for executing the steps of the method that is an object of the invention as described above.

The invention further proposes a computer program product stored on a storage medium and including a set of instructions executable by a computer or by the microprocessor of an electronic device. During the execution of said instructions, said program executes the steps of the above method.

The method of masking the end-of-life transition of an electronic device and the electronic device including a corresponding control module, both objects of the invention, are applicable to any type of electronic device but preferably, although not limited to, electronic devices such as smart cards which process and/or store personal, private, or confidential data.

BRIEF DESCRIPTION OF THE DRAWINGS

They will be better understood from reading the following description and examining the accompanying drawings, in which:

FIG. 1b represents a purely illustrative timing diagram of the steps executed during the method illustrated in FIG. 1a;

FIGS. 1c to 1f are purely illustrative representations of some advantageous details of the steps of the method illustrated in FIG. 1a;

DETAILED DESCRIPTION

A more detailed description of the method for masking the end-of-life transition of an electronic device according to one embodiment of the invention will now be given in relation to FIGS. 1a to 1f.

In general, the method for masking the end-of-life transition of a circuit board, said method being an object of the present invention, applies to any electronic device comprising a microprocessor, random access memory, read-only memory, and reprogrammable non-volatile memory containing an end-of-life state variable for the electronic device, said state variable being managed by a control module. More particularly, the electronic device can also comprise an input/output port which allows exchanging data with a host device or even within a network, for example. The concept of reprogrammable non-volatile memory covers electrically programmable memory, EEPROM memory, flash memory, etc.

During its operation, said electronic device executes a startup phase, denoted ATR (Answer To Reset), then successive current commands, denoted COM.

In particular, it is understood that the corresponding electronic device can advantageously consist of any smart card, for example.

Figure 1A:
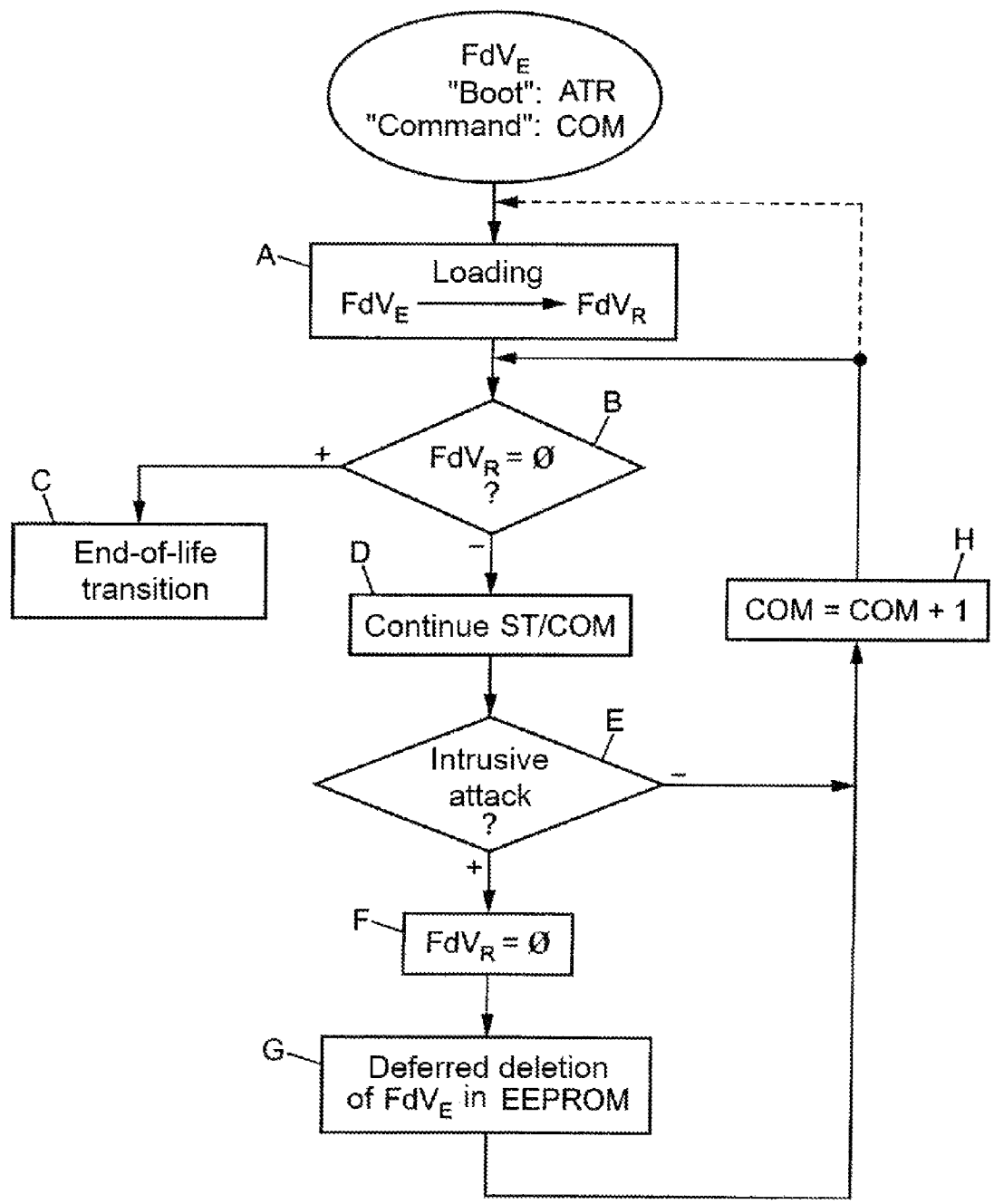
FIG. 1a represents a purely illustrative flowchart of the steps of the method according to an embodiment of the invention.

With reference to FIG. 1a, the method for masking the end-of-life transition of an electronic device comprises a step A consisting of loading into the random access memory of the electronic device, from the non-volatile memory of said device, the value $FdV_E$ of the end-of-life variable stored in non-volatile memory.

The operation corresponding to step A is denoted:

$$FdV_E \rightarrow FdV_R.$$

In the above relation, $FdV_R$ indicates the value of the end-of-life state variable for the electronic device, loaded in random access memory.

One will note that, in the specific case where the end-of-life variable $FdV_E$ stored in non-volatile memory has an empty value, meaning a predefined default value, for example following a deletion only of a previously stored value for this variable, the end-of-life state variable $FdV_R$ loaded into the random access memory of the electronic device will advantageously have the same empty value. As a variant, a given non-empty value, meaning a value different from the empty value, could be assigned to the variable $FdV_R$ when the variable $FdV_E$ has an empty value. This given value can, for example, be the value "true" (or "OK") or any other defined value. In this latter case, the loading into random access memory of the value of the end-of-life state variable stored in non-volatile memory is thus accompanied by a change of value (or an assignment of a value in order to change from an empty value to a given non-empty value).

After step A in FIG. 1a, and prior to the execution of any current command COM by the microprocessor, the method then consists of checking, in step B, the value of the end-of-life state variable stored in random access memory. This check can, for example, consist of verifying that $FdV_R$ has a value, in other words verifying whether or not $FdV_R$ has the empty value. In the case mentioned above where $FdV_R$ assumes a given non-empty value when $FdV_E$ has an empty value, for example the value of "true" (or "OK"), said verification could consist of comparing the value of $FdV_R$ to this given non-empty value, or conversely to a value different from this given non-empty value. In step B of the non-limiting example illustrated in FIG. 1a, this verification is represented by a step that tests:

$$FdV_R = \emptyset ?$$

In this relation, Ø represents the empty value, as defined above, for the end-of-life state variable stored in the random access memory of the electronic device.

If the response to the test in step B is positive, the method consists of executing C the end-of-life transition operations for the electronic device.

Conversely, if the response to the test executed in step B is negative, meaning the end-of-life state variable stored in random access memory FdVR has a non-empty value, the method consists of continuing with the initialization and/or execution of the current command COM by the microprocessor of the electronic device. The execution of the current command corresponds to any command of an application executed by the electronic device.

During this execution and upon detection, in step E, of an intrusion attack, the method consists of writing, in step F, the variable $FdV_R$ to the sole random access memory of the end-of-life state variable for the electronic device, and continuing with the initialization and/or execution of the current command COM. Writing the variable $FdV_R$ causes this variable to assume the empty value defined above (meaning the predefined default value for non-volatile memory), or a given non-empty value such as the value "true" (or "OK").

In step F of the non-limiting example illustrated in FIG. 1a, the write operation is denoted by the relation:

$$FdV_R = \emptyset.$$

In the above relation, the value Ø indicates the empty value defined above.

Lastly, said step F of writing to random access memory is followed by a step G consisting of performing a deletion only of the end-of-life state variable $FdV_E$ in the non-volatile memory, in a deferred manner so that it is executed in place of the next update operation (delete and/or write) in non-volatile memory. This masks the change made to the end-of-life state variable, which prevents a malicious third party from being able to clearly distinguish this operation in a timely manner from a normal update in non-volatile memory, for example as part of the execution of a standard command.

"Deletion only" is understood to mean a phase of deleting the stored value of the variable $FdV_E$ concerned, which causes said variable to assume the empty value as defined above. This delete phase is not followed by a write phase in which a non-empty value, in other words a value that is different from the empty value, would be assigned to said variable in the space dedicated to it in the non-volatile memory. In other words, after a deletion only of the variable $FdV_E$, the latter variable stores the empty value in non-volatile memory. Such an empty value is therefore distinguished from a non-empty value, even a specific one, in that it does not require any write phase.

Due to only deleting the end-of-life state variable $FdV_E$, the processing time and the consumption of electrical energy caused by this deletion are reduced compared to a situation where there is a write of the end-of-life state variable $FdV_E$ in non-volatile memory. The processing time and the consumption of electrical energy associated with a write phase are saved. As an illustration, this savings can be estimated as a reduction in the processing time and electrical consumption of about a factor of 2 compared to the situation described in FR 07 08242 and PCT/FR2008/052106.

Said step G is, for example, followed by returning to execute the next current command, in step H. In said step, COM+1 indicates the next command.

As represented in FIG. 1a, this return occurs in step B as a simple execution of the next command.

However, in another possible implementation of the method, the return can be as represented by the dotted lines in FIG. 1a, where it is upstream from the loading performed in step A, in order to systematically repeat the process of loading the value of the end-of-life state variable $FdV_E$ into random access memory. Such a process is not essential but can be implemented as a variant.

Figure 1B:
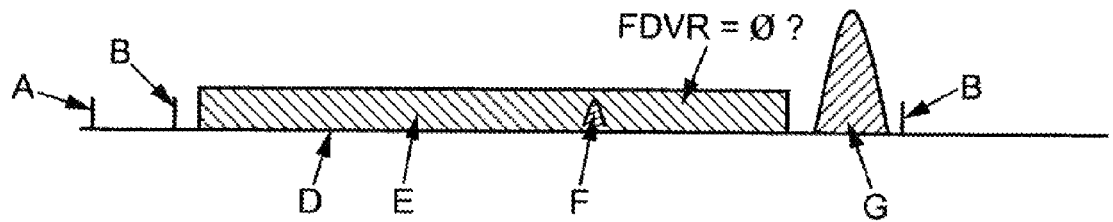

In FIG. 1b, the operations that execute the steps of FIG. 1a are represented in a timing diagram.

In particular, step A can be executed at startup ATR or prior to the execution of each command COM, as mentioned above.

The test in step B is executed prior to continuing with the startup or execution of the current command represented by the hatched area on the left in FIG. 1a. Keep in mind that a positive response to the test in step B automatically causes the electronic device to transition into its end-of-life in step C.

The continuation of the startup or initialization or even the execution of the current command in step D corresponds to the use of algorithmic processes which manipulate secrets for the electronic device when the latter consists of a smart card for example.

The test in step E, corresponding to a test for detecting an intrusion attack, can be implemented in the conventional manner either by executing anti-DFA mechanisms (Differential Fault Analysis, a method of attack consisting of introducing faults in order to deduce information on the data being processed) or by data integrity verification processes for example.

The step of writing the end-of-life state variable for the electronic device in the sole random access memory, step F, is executed by the end-of-life transition control module of the electronic device and occurs by writing this state variable according to the relation mentioned above:

$$FdV_R = \emptyset.$$

Step G, consisting of the deletion only of the end-of-life state variable $FdV_E$ in non-volatile memory, usually EEPROM memory, is then executed in a deferred manner, meaning in place of the next update (delete and/or write) to be performed in the current command or in a later command.

In FIG. 1b, this operation is represented by the hatched peak on the right illustrating the increase in the current consumed by said memory due to the deletion only operation in said memory.

Step E is then followed by a return either to step B, or to step A, as described above in relation to FIG. 1a.

Figure 1C:
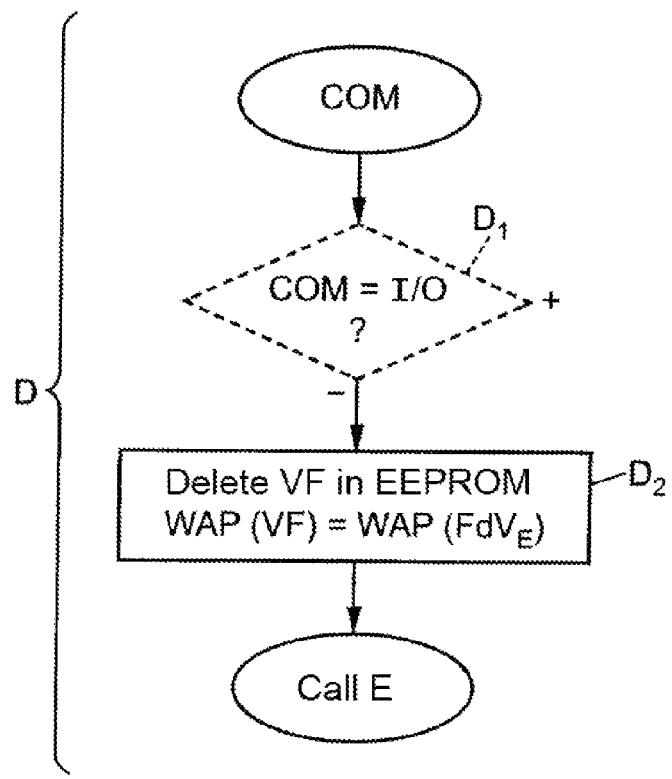

As is represented in FIG. 1c, any set of commands executed by the microprocessor of the electronic device, including commands ($COM_W$) comprising a systematic operation in non-volatile memory and commands ($COM_{\overline{W}}$) not including an operation in non-volatile memory, is considered. In such case, the method additionally comprises, independently of the detection or non-detection of an intrusion attack, the execution of a deletion only $D_2$ of a dummy variable in non-volatile memory, this variable being denoted VF. This dummy variable can consist of any variable stored in non-volatile memory that is different from the end-of-life state variable $FdV_E$ of the electronic device. This even further masks any deletion of the end-of-life state variable in the non-volatile memory of the electronic device. Indeed, a malicious third party cannot easily distinguish the deletion of the end-of-life state variable and the deletion of a dummy variable, these two types of deletion having similar or even identical electrical signatures.

Preferably, the deletion only of the dummy variable VF is executed in the same page of memory as that of the end-of-life state variable.

In step $D_2$ represented in FIG. 1c, the delete operation in the same page of memory is represented by the relation:

$$WAP(VF)=WAP(FdVE).$$

In the above relation, WAP indicates the address of the page of memory for the deletion.

Step $D_2$ is followed by a call to step E of FIG. 1a.

In addition, as represented in the same FIG. 1c, the deletion only of the dummy variable in non-volatile memory is executed prior to any data transmission operation on the line of the input-output port of the electronic device. In FIG. 1c, the corresponding operation is represented symbolically by the detection of any input/output operation by the relation:

$$COM=I/O?$$

The detection of such an operation then causes the systematic and immediate deletion of the dummy variable, as described above in the description.

Figure 1D:
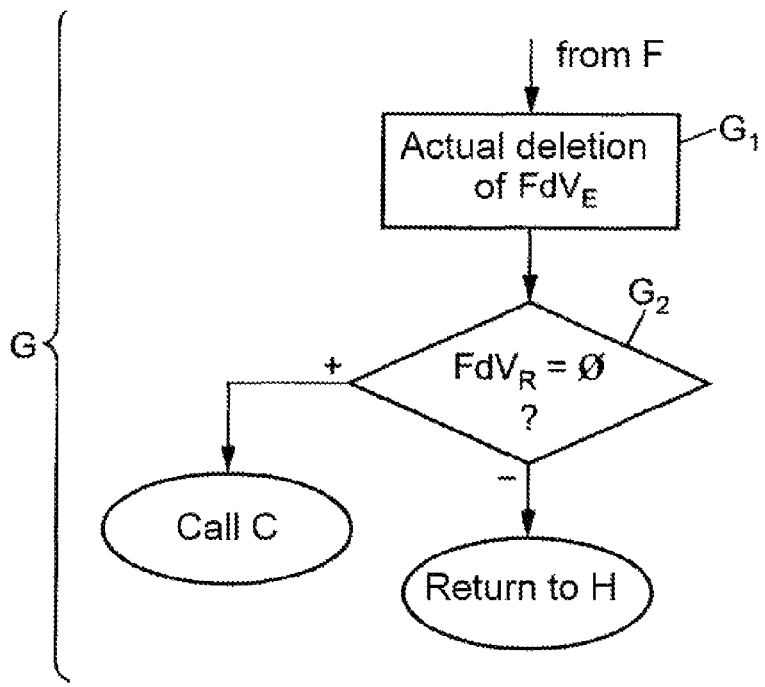

Lastly, as represented in FIG. 1d, the method advantageously includes, following any deletion only of the end-of-life state variable $FdV_E$ in non-volatile memory as represented in step G1, a step denoted G2 consisting of checking whether the value of the end-of-life state variable $FdV_R$ stored in random access memory is the empty value as defined above. The operation corresponding to said step is indicated by the relation:

$$FdV_R=\emptyset.$$

After checking whether the end-of-life state variable $FdV_R$ has the empty value, a step of executing the end-of-life transition operations for the electronic device is performed by calling step C represented in FIG. 1a.

Conversely, if the end-of-life state variable $FdV_R$ does not have the empty value, the method returns to step H.

Figure 1E:
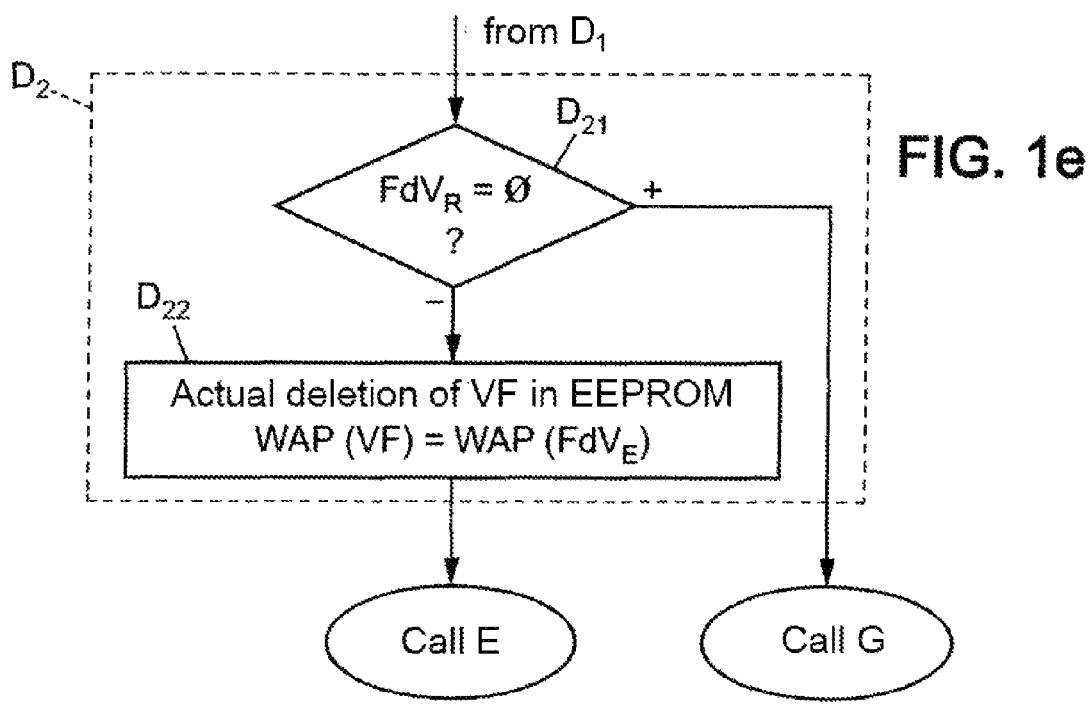

In addition, as was also represented in FIG. 1e, after checking in step $D_{21}$ whether the value of the end-of-life state variable $FdV_R$ is the empty value, said test $D_{21}$ being positive, the deletion only of the value of the end-of-life state variable $FdV_E$ in EEPROM memory is substituted for the deletion only of the dummy variable VF in non-volatile memory, represented in step $D_{22}$ of FIG. 1e, by calling step G of FIG. 1a.

The method advantageously also allows the implementation of an error counter.

In general, updating an error counter is subject to the same restriction as updating an end-of-life variable.

Because of the fact that this involves a write to EEPROM non-volatile memory, such a write is normally detectable because of the added electrical energy consumed by this memory during the write operation.

The method can therefore advantageously allow, in the case where errors are detected that do not justify a direct transition into end-of-life, incrementing a counter before performing the normal deletion. The value of this counter is then regularly checked and when a threshold value is exceeded this triggers an end-of-life transition.

Figure 1F:
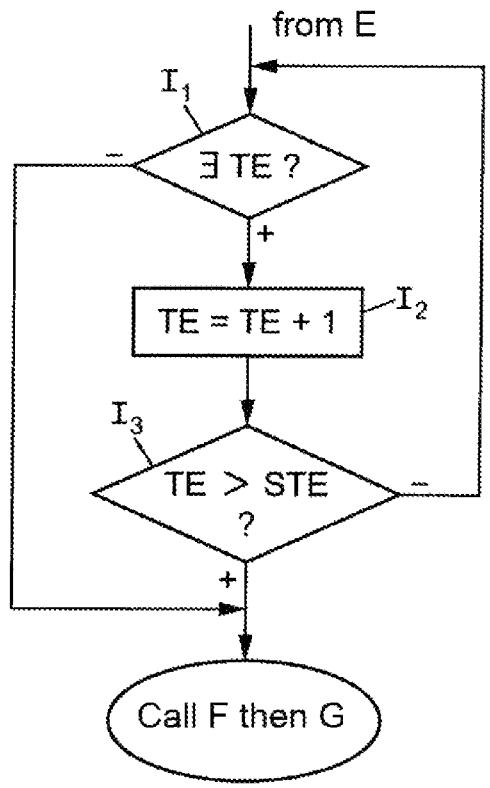

Such a mode of operation is represented in FIG. 1f, as follows:

upon detection $I_1$ of a temporary error in executing an instruction, different from an intrusion attack and not justifying an end-of-life transition of the electronic device, the detection of the temporary error being denoted $\exists$ TE ? where TE indicates said temporary execution error, a positive response in test $I_1$ calls a step $I_2$ which updates an error counter in random access memory.

The value updated in step $I_2$, represented by the relation:

$$TE=TE+1$$

is then followed by a step $I_3$ of comparing the count of updated values to a threshold value, denoted STE.

In the test step $I_3$ the comparison operation is denoted:

$$TE>STE?$$

When the value of the updated error count exceeds the threshold value, in other words when the response to test $I_3$ is positive, the value of the end-of-life state variable of the electronic device is written to random access memory and the end-of-life transition is carried out, by calling step F then G as represented in FIG. 1f.

Figure 2:
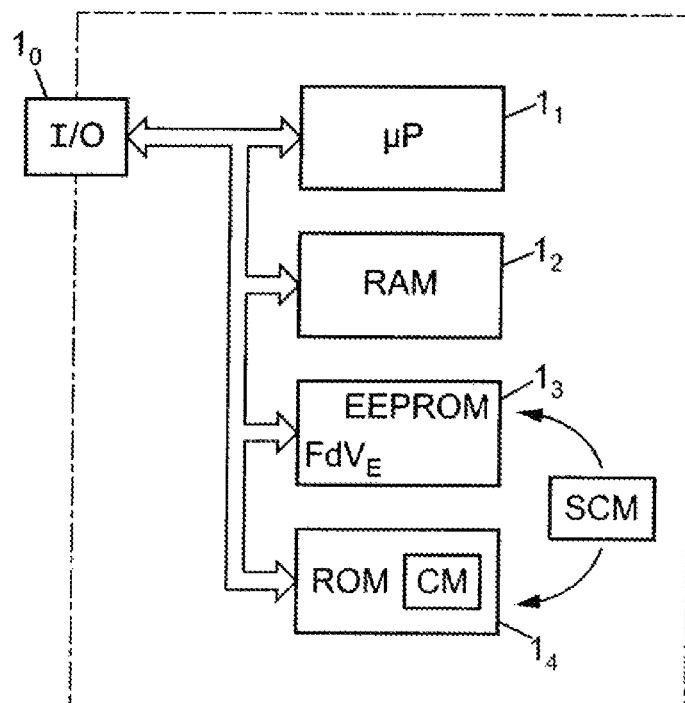
FIG. 2 represents a purely illustrative functional diagram of the architecture of an electronic device equipped with an end-of-life transition control module according to an embodiment of the invention.

An electronic device comprising a microprocessor denoted $1_1$, a random access memory denoted $1_2$, a non-volatile memory denoted $1_3$, for example EEPROM, and a read-only memory denoted $1_4$, is now described in relation to FIG. 2. In addition, as represented in said figure, the device comprises an input/output port denoted I/O.

As is represented in FIG. 2, during its operation the electronic device comprises an end-of-life state variable for this electronic device, denoted $FdV_E$, managed by a control module CM which may for example be a software module stored in read-only memory $1_4$.

The control module CM includes a computer program module SCM which allows executing the steps of the method for masking the end-of-life transition of an electronic device, as described above in relation to FIGS. 1a to 1f.

Of course, the computer program module SCM can be stored in EEPROM non-volatile memory, which constitutes a storage medium. This computer program module includes a set of instructions executable by the microprocessor of the electronic device and, during the execution of said instructions, it executes the steps which carry out the method as described above in relation to all or part of FIGS. 1a to 1f.

The method for masking the end-of-life transition of an electronic device, which is an object of the invention, has been implemented on circuit boards. Very advanced tests executed on these boards by independent trusted entities have been unable to prevent the end-of-life transition of these circuit boards, unlike circuit boards equipped with conventional end-of-life transition processes, with which it is possible to repeat intrusion attacks until an exploitable fault is found. As a result, it is apparent that the method of the invention no longer allows timely differentiation of the case where an attack has been detected and therefore an end-of-life transition of the electronic device is taking place, from the case where the attack was not detected or produced no effect.

The invention claimed is:

1. Method for masking the end-of-life transition of an electronic device comprising a microprocessor, a random access memory, a read-only memory, a reprogrammable non-volatile memory containing an end-of-life state variable of the electronic device, said state variable being managed by a control module, and an input-output port, said method comprising the following steps:

loading (A) the value ($FdV_E$) of said end-of-life state variable into random access memory, from said non-volatile memory; and, prior to the execution of any current command by said microprocessor:

checking (B) the value of said end-of-life state variable stored in random access memory ($FdV_R$); and in the event of an empty value: executing (C) the end-of-life transition operations for the electronic device; otherwise, said end-of-life state variable stored in random access memory ($FdV_R$) having a non-empty value:

continuing (D) the initialization and/or execution of the current command (COM) by the microprocessor of the electronic device; and, upon detection (E) of an intrusion attack:

writing (F) said end-of-life state variable of the electronic device ($FdV_R$) to the sole random access memory, and continuing the initialization and/or execution of the current command; and performing (G) a deletion only of the end-of-life state variable ($FdV_E$) in said non-volatile memory, in a deferred manner so that it is carried out in place of the next update operation in non-volatile memory, said deletion only being a deletion phase not followed by a writing phase.

2. Method according to claim 1, wherein, for a set of commands executed by the microprocessor of the electronic device (COM∈{$COM_W$,$COM_{\overline{W}}$}), including commands ($COM_w$) comprising a systematic operation in non-volatile memory and commands ($COM_{\overline{W}}$) not comprising any operations in non-volatile memory, said method additionally comprises, independently of the detection or non-detection of an intrusion attack, the execution of a deletion only in non-volatile memory of a dummy variable that is different from the end-of-life state variable of the electronic device.

3. Method according to claim 2, wherein the deletion only of the dummy variable is executed in a same page of memory as that of said end-of-life state variable.

4. Method according to claim 2, wherein the deletion only of the dummy variable in non-volatile memory is executed prior to any execution of a data transmission operation on the line of the input/output port of the electronic device with microprocessor.

5. Method according to claim 4, wherein, if the value of said end-of-life state variable ($FdV_R$) is the empty value, a deletion only of the value of the end-of-life state variable ($FdV_E$) in non-volatile memory is substituted for the deletion only of the dummy variable in non-volatile memory.

6. Method according to claim 2, additionally comprising, following any deletion only of the end-of-life state variable ($FdV_E$) in non-volatile memory, a step consisting of checking whether the value of said end-of-life state variable stored in random access memory (FdVr) is the empty value, and, in the event that it does have this empty value, a step of executing the end-of-life transition operations for the electronic device.

7. Method according to claim 1, wherein, upon detection of a temporary error in the execution of an instruction that is different from an intrusion attack and does not justify an end-of-life transition of the electronic device, said method additionally includes:

updating by incrementing an error counter in random access memory;

comparing the value of the error counter to a threshold value, and if said threshold value is exceeded by said error counter value:

writing the value of said end-of-life state variable of the electronic device in the random access memory and executing the end-of-life transition for the electronic device.

8. Electronic device comprising a microprocessor, a random access memory, a read-only memory, a reprogrammable non-volatile memory containing an end-of-life state variable for the electronic device ($FdV_E$), said state variable being managed by a control module, and an input/output port, wherein said control module includes a computer program module (SCM) for executing the steps of the method according to claim 1.

9. A product non-transitory computer readable storage medium, with a program stored thereon, said program including a set of instructions executable by a computer or by the microprocessor of an electronic device, wherein, during the execution of said instructions, said program executes the steps of the method according to claim 1.

* * * * *